United States Patent
Smithwick

(10) Patent No.: US 10,001,648 B2
(45) Date of Patent: Jun. 19, 2018

(54) OCCLUSION-CAPABLE AUGMENTED REALITY DISPLAY USING CLOAKING OPTICS

(71) Applicant: Disney Enterprises, Inc., Burbank, CA (US)

(72) Inventor: Quinn Yorklun Jen Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days. days.

(21) Appl. No.: 15/099,412

(22) Filed: Apr. 14, 2016

(65) Prior Publication Data

US 2017/0299866 A1    Oct. 19, 2017

(51) Int. Cl.
| | | |
|---|---|---|
| *G02B 27/01* | (2006.01) | |
| *G06T 19/00* | (2011.01) | |
| *G02B 5/00* | (2006.01) | |
| *G02B 17/00* | (2006.01) | |

(52) U.S. Cl.
CPC ......... *G02B 27/0172* (2013.01); *G02B 5/003* (2013.01); *G02B 17/008* (2013.01); *G06T 19/006* (2013.01); *G02B 2027/0118* (2013.01)

(58) Field of Classification Search
CPC ........ G06T 19/006; G06F 3/013; G06F 3/011; G02B 27/017
See application file for complete search history.

(56) References Cited

U.S. PATENT DOCUMENTS

| | | |
|---|---|---|
| 5,831,712 A | 11/1998 | Tabata et al. |
| 5,913,591 A | 6/1999 | Melville |
| 7,379,247 B2 | 5/2008 | Goto |
| 7,639,208 B1 * | 12/2009 | Ha ............... G02B 27/0172 345/204 |
| 9,164,281 B2 | 10/2015 | Hing et al. |
| 2011/0075257 A1 | 3/2011 | Hua et al. |
| 2012/0313839 A1 | 12/2012 | Smithwick et al. |

(Continued)

OTHER PUBLICATIONS

Kiyokawa et al. "An Occlusion-Capable Optical See-through Head Mount Display for Supporting Co-located Collaboration" 2003 IEEE, downloaded from <http://bdcampbell.net/articles/ISMARPaper.pdf>, pp. 1-9.

(Continued)

*Primary Examiner* — Yuehan Wang

(74) *Attorney, Agent, or Firm* — Patterson + Sheridan, LLP

(57) ABSTRACT

Embodiments herein describe AR systems that provide occluded AR content to a user while maintaining the perspective of the user. In one embodiment, the AR system includes an optical cloak that contains a mask display device and an AR display device and one or more focusing elements for focusing light captured from the user's environment. As the light enters the optical cloak, the mask display device occludes a portion of the user's view to generate a black silhouette. The AR system then combines AR content displayed by the AR display device with the image of the environment such that the location of the AR content overlaps with the location of the black silhouette. Furthermore, the spacing and characteristics of the focusing elements is set to maintain the perspective of the user as the light passes through the optical cloak.

16 Claims, 9 Drawing Sheets

(56) References Cited

U.S. PATENT DOCUMENTS

| | | | |
|---|---|---|---|
| 2013/0208014 A1* | 8/2013 | Fleck | G06K 9/00684 |
| | | | 345/672 |
| 2014/0112651 A1 | 4/2014 | Sato | |
| 2014/0177023 A1 | 6/2014 | Gao et al. | |
| 2016/0247319 A1 | 8/2016 | Nowatzyk et al. | |
| 2017/0185037 A1* | 6/2017 | Lee | G03H 1/2205 |

OTHER PUBLICATIONS

Kiyokawa et al. "An optical see-through display for mutual occlusion with a real-time stereovision system" 2001 Elsevier Science Ltd, downloaded from <http://www-prima.inrialpes.fr/perso/Tran/Documents/Articles/J.Crowley/25_5.pdf>, pp. 1-15.

Kiyokaw et al. "ELMO: An Enhanced Optical See-Through Display Using an LCD Panel for Mutual Occulsion", downloaded from <http://lab.ime.cmc.osaka-u.ac.jp/~kiyo/cr/kiyokawa-2001-03-ISMR2001/kiyokawa-2001-03-ISMR2001.pdf> on Apr. 4, 2016, pp. 1-2.

Choi et al. "Paraxial ray optics cloaking", 2014 Optical Society of America, vol. 22, Issue 24, downloaded from <https://www.osapublishing.org/oe/fulltext.cfm?uri=oe-22-24-29465&id=304785>, 14 pages.

Cakmakci et al. Design of a compact optical see-through head-worn display with mutual occlusion capability', downloaded from <http://citeseerx.ist.psu.edu/viewdoc/download?doi=10.1.1.63.8378&rep=rep1&type=pdf>, 6 pages.

Disney Enterprises, Inc., U.S. Appl. No. 15/150,916, filed May 10, 2016, 42 pages.

Ozan Cakmakci, Yonggang Ha and Jannick P. Rolland, "A Compact Optical See-through Head-Worn Display with Occlusion Support," Conference Paper, Jan. 2004, 11 pages.

Swift, "Image Rotation Devices—A comparative survey", Optics Lasers and Technology, pp. 175-188, 1972.

* cited by examiner

OCCLUSION-CAPABLE AUGMENTED REALITY DISPLAY USING CLOAKING OPTICS

BACKGROUND

Field of the Invention

The embodiments herein are generally directed to providing occlusion and maintaining the perspective of the user when displaying augmented reality (AR) content.

Description of the Related Art

AR displays insert virtual content into real-world views of the user's environment. For example, a user may wear a headset that captures views of the real world and includes a lens and a display device that outputs the AR content. Using a beam-combiner, the headset combines the real-world image passing through the combiner with AR content viewed through the lens, so it appears in focus and at "infinity" (a far distance relative to the headset) before reaching the eye of the user. Thus, the user sees the AR content integrated into the real-world image. However, the appearance of the AR content is typically semi-transparent and cannot occlude the background since the light outputted by the display device combines with the light of the real-world image. Moreover, the AR content cannot display the color black since black is the absence of light, and thus, cannot be emitted by the display device. Put differently, if the any part of the AR content is black, when combined with the real-world image, the user will see only the real-world image at the portions of the AR content that should be black. Occlusion and high-contrast AR content is important for visually integrating AR content and real-world imagery.

To improve the appearance of the AR content, some AR displays first occlude a portion of the real-world image before combining the real-world image and the AR content. In this case, the AR display uses a lens to focus the real-world onto a plane and also includes a first display through which the real-world image passes. While most of the first display is transmissive, a portion of the first display is opaque thereby creating a black silhouette that occludes a portion of the real-world image. Later, using second display, the AR content is combined to appear in the same location of the black silhouette overlaying the real-world image. For example, if the AR content is a cartoon character, the AR display controls the first display to generate an opaque portion with the same outline as the cartoon character. Because the AR content is combined with the real-world image at the location of the black silhouette, the appearance of the AR content is more vibrant, high-contrast and can include the color black. The AR content and silhouette are viewed through a second lens to appear at "infinity." However, this technique suffers from drawbacks such as inverting the real-world image and moving the perspective of the user to a point in front of the AR display.

SUMMARY

One embodiment described herein is an AR system that includes a first focusing element configured to receive light defining a view of a user environment, a mask display screen configured to occlude a selected portion of the view as the received light passes through the mask display screen, an AR display screen configured to emit light defining AR content that is added to the view at a location of the occluded selected portion, and a second focusing element configured to emit the view containing the AR content to a user. Moreover, a spacing between the first and second focusing elements is set such that the received light defining the view exits the second focusing element as if passing through free space.

Another embodiment described herein is an AR system that includes a first focusing element configured to receive light defining a view of a user environment, a mask display screen configured to occlude a selected portion of the view as the received light passes through the mask display screen, an AR display screen configured to emit light defining AR content that is added to the view at a location of the occluded selected portion, a second focusing element configured to emit the view containing the AR content to a user, and a plurality of reflective surfaces configured to redirect an optical path of the received light as the received light travels between the first and second focusing elements, wherein the plurality of reflective surfaces fold the optical path.

Another embodiment described herein is a method that includes receiving light defining a view of a user environment at a first focusing element, occluding a selected portion of the view to produce a silhouette of AR content in the view introducing the AR content into the view at the location of the silhouette, and outputting the view containing the AR content at a second focusing element. Moreover, a spacing between the first and second focusing elements is set such that the received light defining the view exits the second focusing element as if passing through free space.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments herein describe AR systems that provide occluded AR content to a user while maintaining the perspective of the user. In one embodiment, the AR system includes an optical cloak that contains a mask display device and an AR display device and one or more focusing elements (e.g., lenses or curved mirrors) for focusing light captured from the user's environment. As the light enters the optical cloak, the mask display device occludes a portion of the user's view to generate a black silhouette. The AR system then combines AR content displayed by the AR display device with the image of the environment such that the location of the AR content overlaps with the location of the black silhouette, thereby improving the quality of the AR content relative to combining the content with a non-occluded portion of light entering from the environment.

In order to maintain the user's perspective as the light passes through the optical cloak, the characteristics of the lenses used in the optical cloak (e.g., their focal length) as well as the spacing between the lenses may be determined using a mathematical model of the optical system by representing each optical element (e.g., the lenses) and the spacing between the elements using matrices which describe how the height and direction of light rays change as the rays pass through the optical elements. The resulting matrices are equated to a predefined matrix representing light simply passing through the empty space along the length of the AR system. The results from this calculation indicate the type of lenses (and their spacing) required to achieve an AR system whose output is the same as if the light passed through empty space, thereby maintaining the user's perspective. The locations of occluding masks and image displays are also provided by the calculations.

In one embodiment, the optical path traveled by light in the optical cloak is folded in order to make a structure containing the AR system (e.g., a headset) more compact. For example, the AR system may include multiple reflective surfaces that redirect the light received from the environment. To account for the folded path, a new parameter is used for the spacing between the first and last lens in the optical cloak. This parameter can be adjusted to permit fold mirrors to be placed in the optical path. Moreover, the parameter can be used to identify the type and spacing of the lenses in the optical cloak required to ensure the output of the optical cloak is the same as if the light passed through empty space, thereby maintaining the user's perspective. Further, the optical path in the optical cloak can be folded an arbitrary number of times and still maintain the user's perspective.

Figure 1:
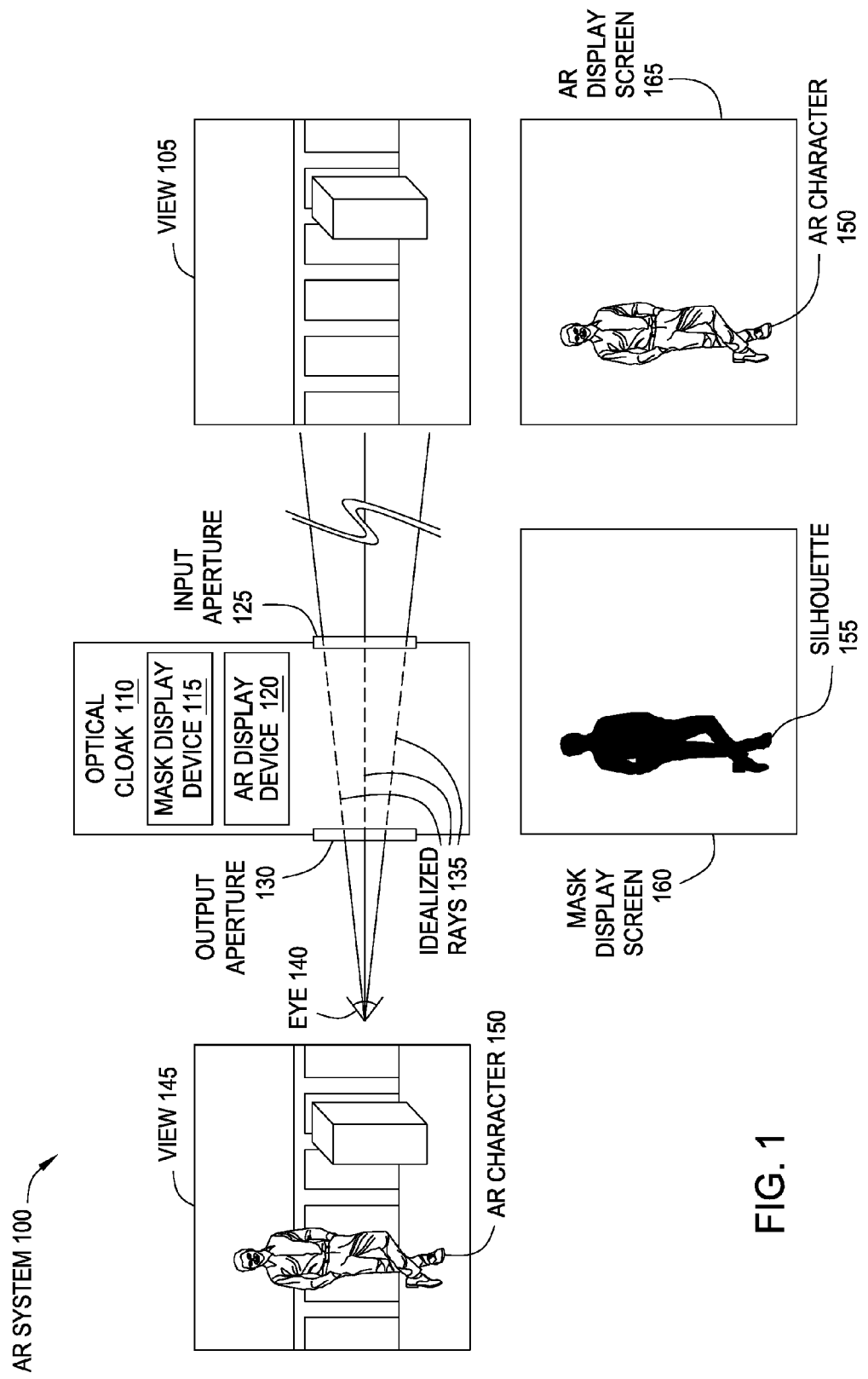
FIG. 1 is a block diagram of an AR system for maintaining the perspective of the user using an optical cloak, according to one embodiment described herein.

FIG. 1 is a block diagram of an AR system 100 for maintaining the perspective of the user using an optical cloak 110, according to one embodiment described herein. In one embodiment, the optical cloak 110 may be contained in a headset or other apparatus which is worn by the user. The optical cloak 110 includes an input aperture 125 (e.g., a focusing element) that captures light from the user's environment and an output aperture 130 aligned with an eye 140 of the user. FIG. 1 illustrates a view 105 of the environment at one particular point in time. Put differently, the view 105 (also referred to as the environmental view) is made up of the light that reflects off of objects (or is emitted by objects) in the environment that passes through the aperture 125 at a particular instant of time.

Although not shown in FIG. 1, the optical cloak 110 may include different optical elements (e.g., internal lenses or mirrors) which deflect or alter the light entering the optical cloak 110 via input aperture 125. However, as described in more detail below, the light exiting the optical cloak 110 via output aperture 130 maintains the perspective of the user. This is illustrated by the idealized rays 135 which traverse through the optical cloak 110 and form straight lines with the light rays entering and exiting the optical cloak 110. Thus, to the perspective of the user, the light exiting optical cloak 110 propagates in the same direction as if the light passed through empty space. Put differently, to the user's perspective, it is as if the optical cloak 110 does not redirect or change the direction of the light in any way as the light travels between the objects in the environment and the user. However, as discussed below, the optical cloak 110 includes multiple optical elements that redirect the direction of the light that traverses therethrough.

To insert AR content into the view 105 of the environment, the optical cloak 110 includes a mask display device 115 and an AR display device 120. As the received light passes through the mask display device 115, the display 115 occludes a portion of the light. In one example, the mask display 115 occludes a portion of the view 105 by absorbing the light in a selected location or area of the view 105. This is shown by a mask display screen 160 in FIG. 1 where a portion of the screen 160 includes a black silhouette 155 while the remaining portion of the screen 160 is transparent. In one embodiment, the mask display device 115 is a liquid crystal display (LCD) panel that does not have a back light. The optical cloak 110 includes logic for controlling the LCD panel such that a portion of the screen 160 blocks or occludes the light received from the environment while the other portion permits the light to pass substantially unabated (i.e., with only minor or no attenuation) through the screen 160. As such, after passing through the mask display screen 160, the resulting image is the same as view 105 except for a blacked out portion corresponding to the location of the silhouette 155 in the mask display screen 160.

In one embodiment, the received light then reaches a beam combiner that permits the AR content displayed on the AR display device 165 to be injected into (or combined with) the light from the environmental view 105. The logic in the optical cloak 110 displays the AR content in a location of an AR display screen 165 such that the AR content corresponds to the same location as the silhouette 155. Put differently, when the AR content displayed in the screen 165 is combined with the image passing through the cloak, the AR content overlaps the silhouette 155 introduced into the image by the mask display screen 160, making the AR content appear opaque. Without the mask display device 115, the AR content would be combined with light received from the environment (which is not controlled by the optical cloak) which may change the illumination and appearance of the AR content in undesired ways (e.g., semi-transparent with low contrast).

Furthermore, if the AR content contains black shaded imagery, these portions of the AR content are replaced by whatever light is received from the environment. For example, if the AR character 150 was wearing black boots, then without the mask display device 115, instead of seeing black boots, the eye 140 would only see the color and shape of whatever object is in the view 105 at the location of the boots. However, because the silhouette 155 introduces a black object into the view 105 at the same location as the AR character 150, the AR content can include the shade of black. For example, if the AR character 150 is supposed to have black boots, then the AR display screen 165 simply does not output any light at the location of the boots in the character 150, thereby permitting this portion of the black silhouette 155 to be seen by the user. In contrast, wherever light and color is desired, the screen 165 outputs light and color which replaces the black silhouette 155. As such, unlike the mask display screen 160, the AR display screen 165 does include a light source (e.g., a backlight in an LCD panel) that enables the screen 165 to output light and color to illuminate the AR character 150. The portion of the screen 165 that does not include the AR character 150 can be black in order to not introduce any additional light into the view 105.

The result of combining the silhouette 155 generated by the mask display device 115, the AR character 150 displayed by the AR display device 120, and the view 105 is shown in view 145. In this example, view 145 is one example of an image generated by the light exited the optical cloak 110 via output aperture 130 after being altered by the mask and AR display devices 115 and 120. As shown, view 145 is exactly the same as view 105 except the AR character 150 has been added. Again, if the AR character 150 has any black, this color is generated by the black silhouette 155. However, if the AR character 150 is made of colors besides black, then none of the black silhouette 155 would be visible to the user.

Although not discussed in detail here, logic in the optical cloak 110 synchronizes the mask and AR display devices 115 and 120 in order to ensure the black silhouette 155 is formed in the mask display screen 160 at a location that corresponds to a location where the AR character 150 is introduced into the view 105. Moreover, the logic can dynamically control the mask display device 115 and the AR display device 120 to insert animated AR content into the images 145. In order to move the character 150 in the environment, the logic synchronously moves the location of the silhouette 155 in the screen 160 and the location of the character 150 in screen 165 such that the AR character 150 continues to overlap the silhouette 155. In this manner, the advantages of displaying AR content in an occluded portion of the environmental view 105 can be maintained as the AR content moves in the view 145.

Furthermore, the AR system 100 may include an object recognition system such as LiDAR or depth cameras for identifying the location of objects in the environment. For example, the object tracking system may identify the box shown in view 105 which permits the optical cloak 110 to illustrate the AR character 150 interacting with the box such as jumping on top of the box. Also, the object recognition system may permit the optical cloak 110 to simulate a depth of the AR character 150 within the view 145. For example, the cloak 110 may make it appear to the user as if the AR character 150 is standing behind the box by only displaying a top half of the character 150 that is above the topmost surface of the box. With the dual layer AR display and/or mask, the depth camera may also place the character in depth by computing the appropriate blending of pixels between the two display layers.

Figure 2A:
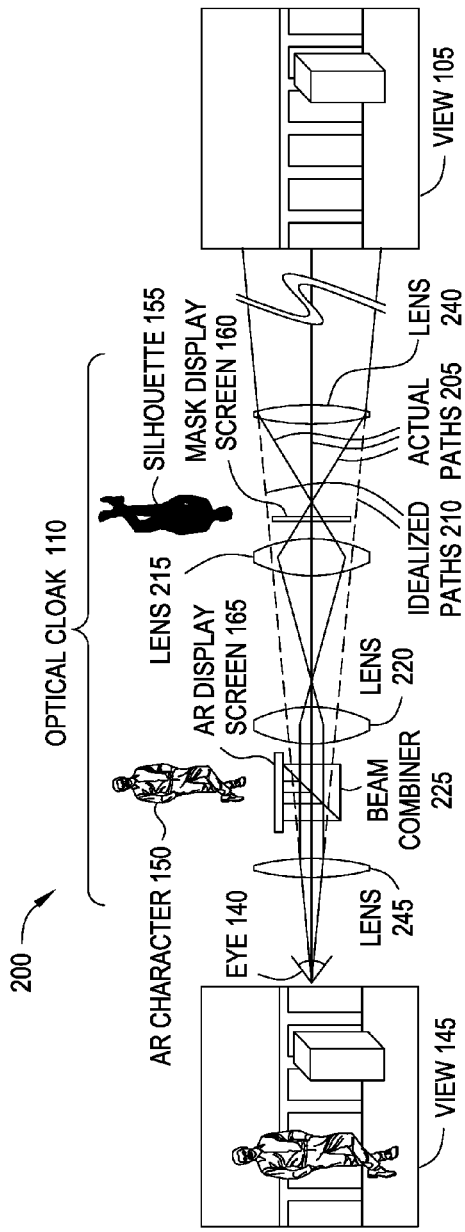
FIGS. 2A-2C illustrate AR systems with a linear optical cloak, according to one embodiment described herein.
Figure 2B:
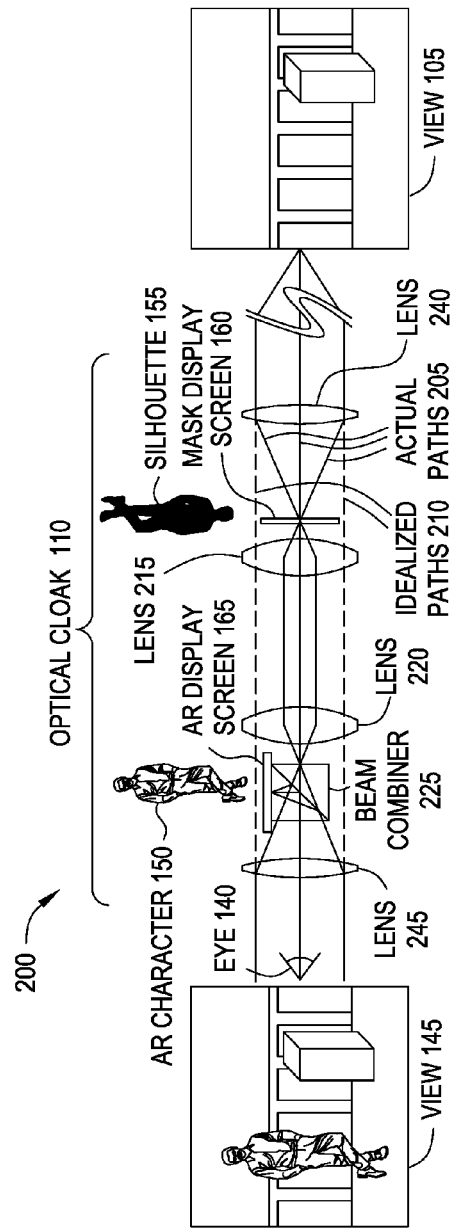

FIGS. 2A and 2B illustrate an AR system 200 with a linear optical cloak 110, according to one embodiment described herein. That is, FIGS. 2A and 2B illustrate one example of the optical cloak 110 that can insert the AR character 150 into the view 105 while maintaining the perspective of the user. The solid lines in FIGS. 2A and 2B illustrate actual paths 205 of the light received from the environment as the light traverses though the optical cloak 110. On the other hand, the dotted lines illustrate the idealized paths 210 of the light which are the paths the light would traverse as if the light passed through empty space. As shown, as the light is emitted from the output lens 245 of the optical cloak 110, the idealized paths 210 and the actual paths 205 merge so that it appears to the user as if the light passed through empty space between input lens 240 and output lens 245. However, as shown, the various lenses in the optical cloak 110 cause the actual paths 205 to vary widely from the idealized path 210 as the light received from the environment traverses the optical cloak 110.

Starting at the right of the optical cloak 110, the light enters through lens 240 which focuses the light at a point near the mask display screen 160. In one embodiment, the focal length of the lens 240 is selected to focus the received light at the screen 160. However, because FIG. 2A illustrates the light entering from the field of view of the user (rather than the light entering from a distant point in the background as shown in FIG. 2B), the lens 240 focuses the light slightly in front of the screen 160. As described above, as the light passes through the screen 160, a portion of the light is occluded by the silhouette 155 while the rest of the light is permitted to pass unabated through the screen 160.

The now inverted image (which includes the silhouette 155) passes through lens 215 which again inverts the image to its original orientation illustrated in view 105. The lens 220 collimates the light before passing through a beam combiner 225. To insert the AR character 150 into the image (or any other type of AR content), the AR display screen 165 emits light illustrating the AR character 150 in a direction perpendicular to the direction through which the received environmental light passes through the beam combiner 225. While the light received at a surface of the beam combiner 225 facing the lens 220 is able to pass through the beam combiner 225, the light received at a surface of the beam combiner 225 facing the screen 165 reflects the light defining the AR character 150 such that this light is now parallel with the light received from the environment. In this manner, the beam combiner 225 combines the received light with the light illustrating the AR character 150. Moreover, in one embodiment, the light illustrating the AR character 150 is located at the same location as the portion in view 105 that was occluded by the silhouette 155. Put differently, the light received from the user's environment at the location of the silhouette 155 is replaced by the light illustrating the AR character 150.

The combination of the light received from the environment and the light defined AR character 150 are focused by lens 245 into the eye 140 of the user, and focuses the AR character 150 at the distance of the background. As a result, the user sees view 145 where a portion of the environment view 105 has been removed and replaced by the AR character 150. Unlike prior techniques for providing AR content by first occluding portions of environmental images, the user's perspective is maintained at the location of the user's eye 140. In the prior techniques for displaying AR content over an occluded silhouette, the user's perspective is moved from the location of the eye 140 to a point between the AR system worn by the user and the environment—e.g., to the right of the lens 240 that receives the light from the environment. Thus, as the user rotates her head, because the viewpoint of the user is many inches in front of her eyes, the location of the AR content in the view 105 changes in an unnatural or unexpected manner. Maintaining the perspective of the user at the eye 140, however, avoids this issue. Furthermore, the relay systems used in prior techniques also result in an inverted image after the AR content has been inserted into the location of the black silhouette. Inverting the image to its correct orientation requires additional optical elements such as lenses or prisms which add weight and costs to the AR system. In contrast, optical cloak 110 outputs an image in the correct orientation.

Moreover, using the dual layer display as shown, the AR character can appear focused at any distance between the apparent location of the near display (i.e., distances within 1-3 meters of the headset) and the far display (i.e., distances that are at least 3-10 meters away from the headset are "infinitely far"). For example, if the viewer focuses on a close AR character, the background should be blurred, and vice versa. Note that this describes monoscopic focus. The embodiments described herein can also be used for stereoscopic 3D display if two optical cloaks (one for each eye) provides a left-right image pair to corresponding eyes. Stereoscopic 3D can provide 3D AR characters at different depths and with dimensionality, but to integrate the AR character into the environment view 105 the stereo views and focus/accommodation cues should match its location in the 3D environment as identified using, e.g., a depth camera.

The characteristics (e.g., focal length, diameter, etc.) and spacing of the lenses in the optical cloak 110 are selected in order to maintain the user's perspective as the light traverses through the cloak 110. To do so, a mathematical model of the optical system is constructed by representing each of the lenses in the cloak and their spacing using matrices which describe how the height and direction of light rays change as they pass through the lenses.

These matrices are parameterized by the focal length of the lenses and the distances between them. The resulting matrix product is equated to a predefined matrix representing light passing through empty space over the length of the optical cloak 110. Solving this equation provides the necessary characteristics of the lenses and their spacing in order to output light as if the light passed through empty space.

In one embodiment, the characteristics and spacing of the lenses may be determined using a Rochester cloaking technique which bends light through the center of the device but maintains the perspective of the user. The publication "Paraxial ray optics cloaking," Joseph S. Choi and John C. Howell, Opt. Express 22, 29465-29478 (2014) (incorporated herein by reference) describes using ABCD matrices so that objects between two lenses can be hidden from view. However, instead of using this technique for hiding objects between lenses, the embodiments herein may use this technique for maintaining the perspective of the user while inserting occluded-AR content into the environmental view 105. An example of these ABCD matrices are shown below:

$$\begin{bmatrix} X_{OUT} \\ \theta_{OUT} \end{bmatrix} = \begin{bmatrix} 1 & 0 \\ -\frac{1}{f1} & 1 \end{bmatrix} \begin{bmatrix} 1 & f1+f2 \\ 0 & 1 \end{bmatrix} \begin{bmatrix} 1 & 0 \\ -\frac{1}{f2} & 1 \end{bmatrix} \begin{bmatrix} 1 & d \\ 0 & 1 \end{bmatrix} \begin{bmatrix} 1 & 0 \\ -\frac{1}{f2} & 1 \end{bmatrix} \quad (1)$$

$$\begin{bmatrix} 1 & f1+f2 \\ 0 & 1 \end{bmatrix} \begin{bmatrix} 1 & 0 \\ -\frac{1}{f1} & 1 \end{bmatrix} \begin{bmatrix} X_{IN} \\ \theta_{IN} \end{bmatrix}$$

Equation 1 illustrates the ABCD matrices for lenses and spaces where $X_{OUT}$ and $\theta_{OUT}$ represent the height and angle of ray outputted by the optical cloak and where the first matrix on the right side of the equation corresponds to a first lens, the second matrix corresponds to a space between the first lens and a second lens, the third matrix corresponds to the second lens, the fourth matrix corresponds to a distance between the second lens and a third lens, the fifth matrix corresponds to the third lens, the sixth matrix corresponds to a space between the third lens and a fourth lens, and the seventh matrix corresponds to the fourth lens. The values $X_{IN}$ and $\theta_{IN}$ represent the height and angle of an input ray into the optical cloak.

FIG. 2B is structurally equivalent to FIG. 2A but illustrates how the optical cloak 110 performs when receiving light from a distant point in the environment. As shown here, lens 240 focuses the light onto the screen 160 which occludes a portion of the view 105 as described above. The lens 215 collimates the light (which now illustrates an inverted image of the environment) while lens 220 again inverts the image before the light passes through the beam combiner 225 where the AR character 150 is injected into the image. Finally, lens 245 again collimates the light before it is provided to the eye 140. While the actual paths 230 taken by the light in the optical cloak 110 differs greatly from the idealized paths 235 (i.e., the path the light would take if the light passed through empty space), at the output of the optical cloak 110, the idealized paths 235 and the actual paths 230 merge thereby maintaining the perspective of the user. Thus, FIGS. 2A and 2B illustrate the perspective of the user is maintained for light that is received within the field of view of the user as well as light received from a distant point in the background of the environment.

In one embodiment, the total distance between lenses 245 and 240 is greater than one foot, and in some cases, as much as three feet. For example, the distance between each of the lenses in the cloak 110 may be around a foot. This length may make mounting the optical cloak in a headset unwieldly for the user and result in a small field of view. As such, the embodiments that follow modify the optical cloak 110 to include one or more folds in the optical path between the input lens 240 and the output lens 245 while still preserving the perspective of the user.

Figure 2C:
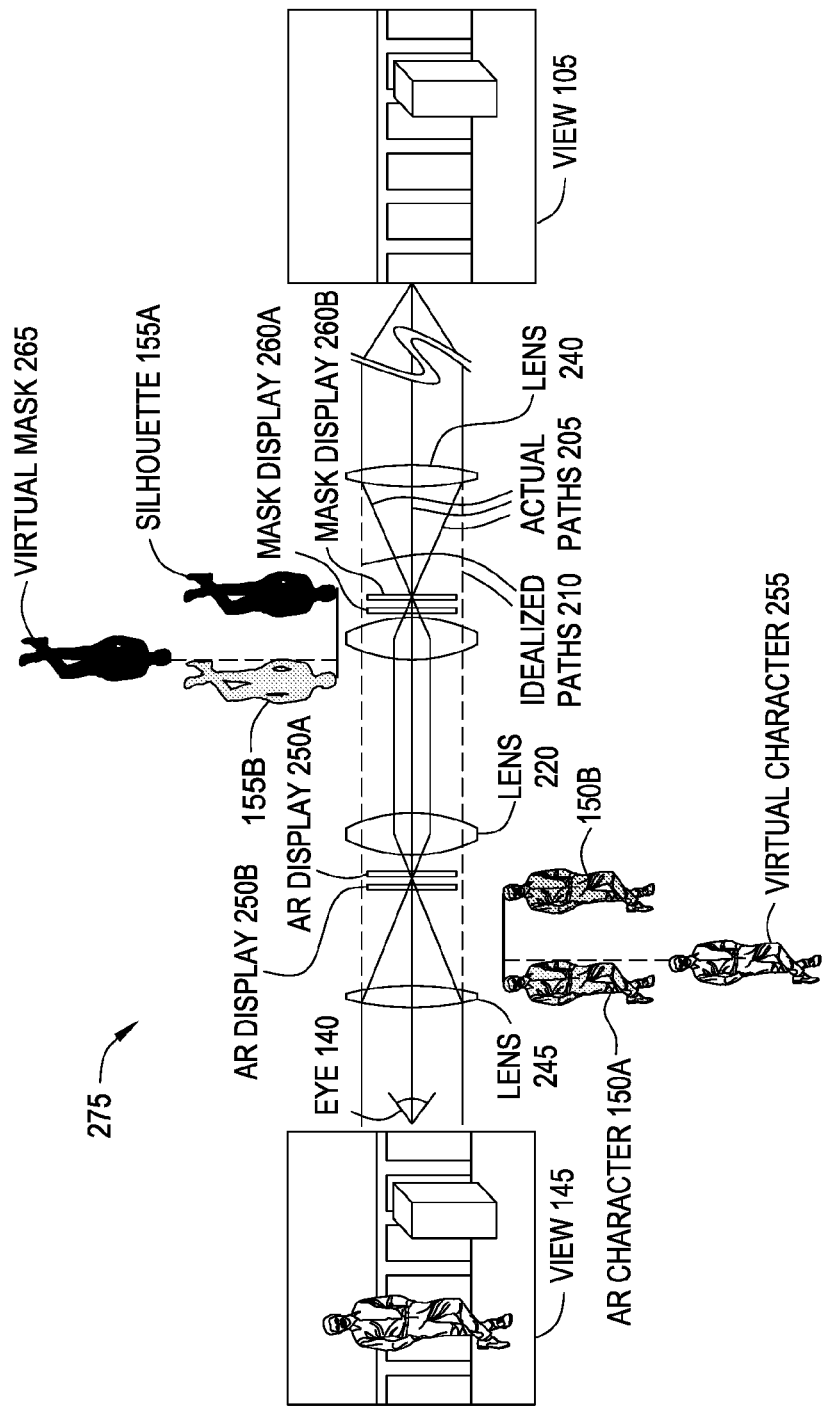

FIG. 2C illustrates an optical cloak 275 which includes two pairs of transparent OLED displays that are spaced apart rather than only a single AR or mask display screen as shown in FIGS. 2A and 2B. A first transparent AR OLED display 250A is located at the focal point of lens 245 and appears at infinity, while a second transparent AR OLED display 250B is spaced closer to the lens 245 than display 250A and appears at closer distance to the eye 140 of the viewer. Virtual pixels of virtual character 255 can be placed at different desired virtual distances between the two OLED displays 250 by splitting their intensities based on their depths (e.g., in object space, if a virtual pixel in the character 255 is to appear one fourth the way between the two displays 250 towards the front, three fourths of its brightness is on the first transparent OLED 250A and one fourth of its brightness is displayed on the second transparent OLED display 250B. Thus, as shown by the dotted line in FIG. 2B, the virtual character 255 appears one fourth of the way between the two displays 250.

In image space, the second display 250B appears at infinity, the second display 250B and the virtual character 255 appear at locations according to the thin lens imaging equation $1/f=1/o+1/i$, where o is the location of the front (or virtual) display 250B from the lens 245, and i is the location of the front (or virtual) display's image viewed through the lens 245 of focal length f. The eye 140 naturally focuses on the virtual pixels in the virtual character 255 rather than at either OLED display 250.

A similar matching arrangement can occur with two spaced mask screens 260, with mask displays 260 located at confocal locations as the corresponding AR displays 250. A virtual mask 265 is placed at a virtual distance between the two planes defined by the mask displays 260 by splitting the attenuation of the virtual mask 265 between the two mask displays 260. However, this splitting is based upon multiplicative attenuation of the mask displays 260 rather than additive emission of the AR displays 250. For example, in object space, to place an opaque virtual mask 265 located at the front mask display 260A, the front mask display 260A is 0% transparent, and the rear mask display 260B is 0% transparent (or any other transparency in this case). For an opaque virtual mask 265 located at the rear mask display 260B, the front mask display 260A is 100% transparent, and the rear mask display 260B is 0% transparent. For an opaque virtual mask 265 located half way between the front and rear mask displays 260A and 260B, the front display 260A is 50% transparent, and the rear mask display 260B is 100% transparent.

Similarly for semi-transparent masks (e.g., overall 50% transparency to the background), in object space, to place an 50% transparent virtual mask 265 located at the front mask display 260A, the front mask display 260A is 50% transparent, and the rear mask display 260B is 100% transparent (or any other transparency in this case). For an opaque virtual mask 265 located at the rear mask display 260B, the front mask display 260A is 100% transparency, and the rear mask display 260B is 50% transparent. For an opaque virtual mask located half way between the front and rear mask displays 260A and 260B, the front display 260A is $1/\sqrt{2}$~71% transparent, and the rear mask display 260B is $1/\sqrt{2}$~71% transparent.

The two masks transparencies multiply to provide the overall transparency (e.g., 71%×71%~50% transparency), and the weighting between the front and rear mask displays 260 determines the location of the virtual semi-transparent mask 265 between the front and rear mask displays 260. The location and computation of the virtual AR character 255 and mask 265 may occur on a per-pixel level, such that the virtual object appears dimensional and 3D. This arrangement of dual layer displays and masks provides natural accommodation 3D cues (and depth blending) for the occluded AR image in depth.

Figure 3A:
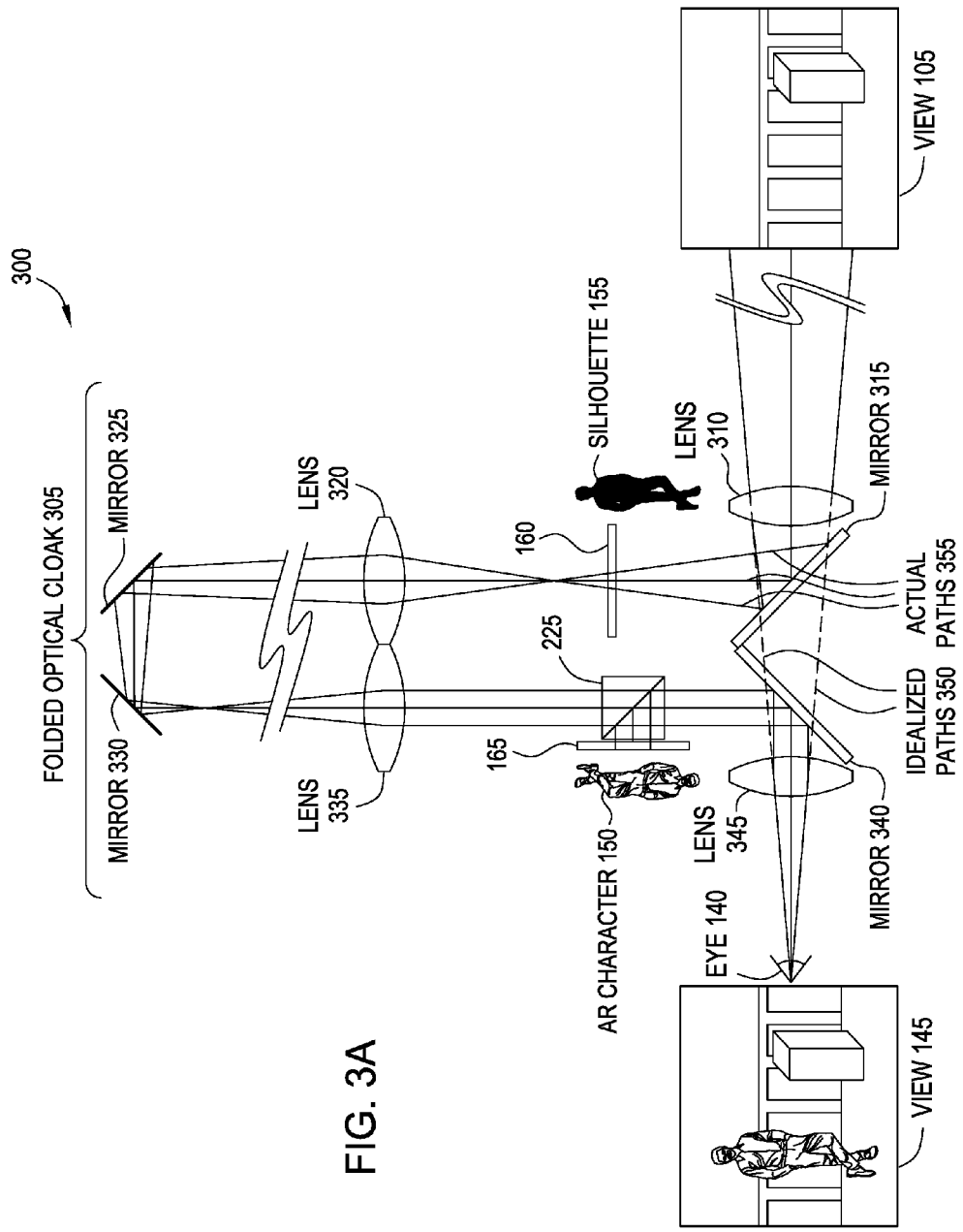
FIGS. 3A-3C illustrate AR systems with folded optical cloaks, according to one embodiment described herein.
Figure 3B:
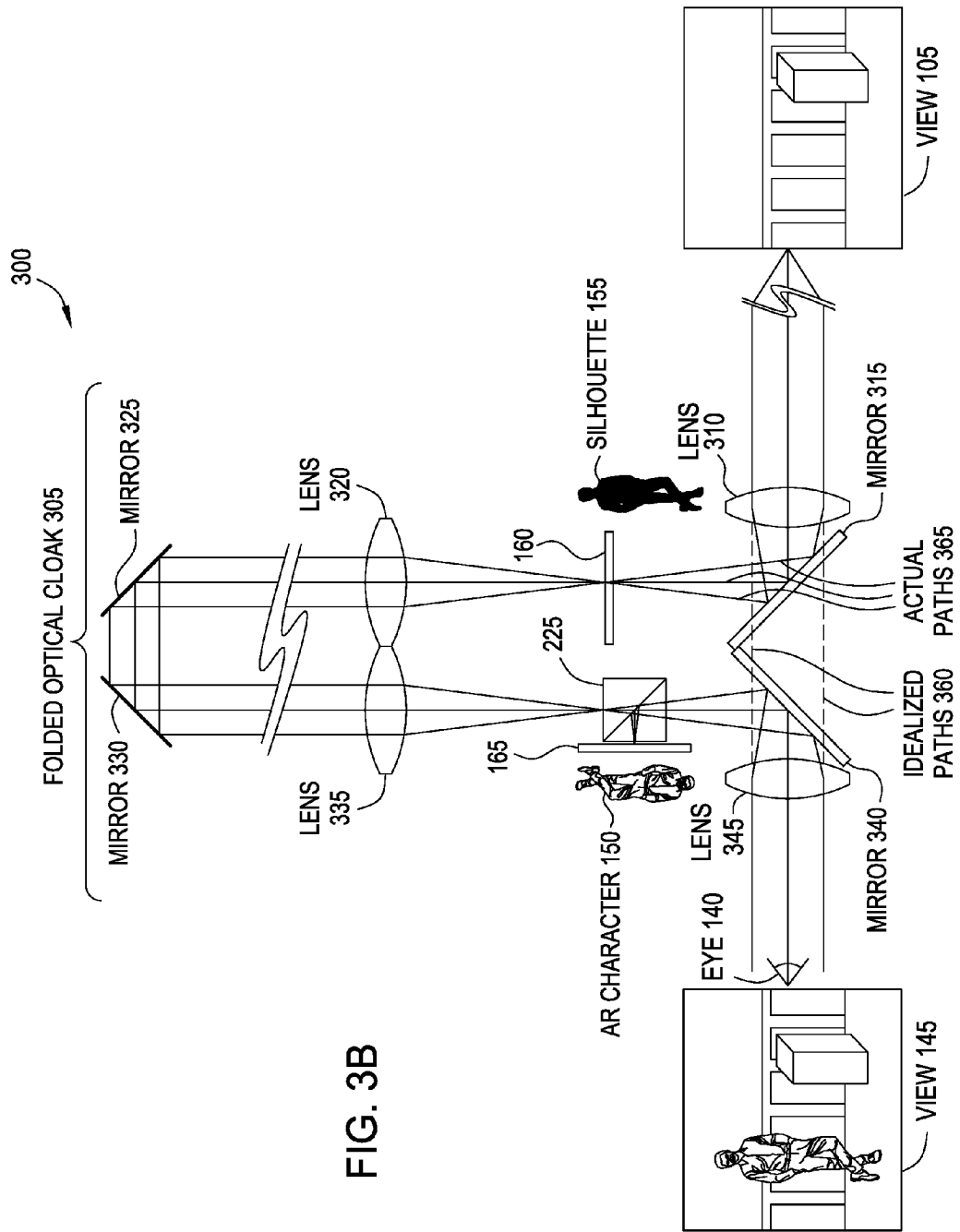

FIGS. 3A and 3B illustrate an AR system 300 with a folded optical cloak 305, according to one embodiment described herein. Like in FIGS. 2A and 2B, the AR system 300 also inserts the AR character 150 into the environmental view 105 to result in the view 145 which is projected onto the eye 140. However, unlike FIGS. 2A and 2B, the optical cloak 305 defines an optical path with multiple folds (four in this example). That is, instead of the light traversing (on average) along a single optical axis through the cloak, in cloak 305 multiple reflective surfaces (e.g., mirrors) are used to reflect the light in different directions.

As shown, the light from the environment enters the optical cloak 305 via lens 310 and is reflected off of mirror 315 which is arranged at 45 degree angle relative to the vertical alignment of the lens 310. After reflecting off the mirror 315, a portion of the light is occluded by the silhouette 155 in the mask display screen 160. The occluded image passes through lens 320, is reflected off mirrors 325 and 330, and then is collimated by lens 335. The collimated light passes through the beam combiner 225 which inserts the AR character 150 into the occluded portion corresponding to the silhouette 155. A mirror 340 then reflects the light through lens 345 into the eye 140. In this example, the distance between the input lens 310 and the output lens 345 is shorter than the distance between the input lens 240 and output lens 240 of optical cloak 110 in FIGS. 2A and 2B. As such, the center of mass of the optical cloak 305 is closer to the eye 140 which may result in the optical cloak 305 being more easily moved and manipulated when mounted in a headset. In one embodiment, the vertical distance between the mirrors 315 and 340 and the mirrors 325 and 330 may be between eight to fifteen inches.

Despite folding the optical path, the optical cloak 305 still maintains the user's perspective. The idealized paths 350 illustrate the path the light would take assuming the light passed through empty space, while the actual paths 355 illustrate the path the light actual traverses in the optical cloak 305. Once the light exits the optical cloak 305 via lens 345, the actual paths 355 are the same as the idealized path 350 thereby maintaining the user's perspective.

As above, the characteristics of the lenses and the spacing of the optical elements (e.g., mirrors and lenses) in the optical cloak 305 are selected to maintain the perspective of the user. To do so, the same matrices described above can be modified to account for the folds in the optical path. In one embodiment, a new parameter is set in the mathematical model to represent the spacing between the first and last apertures—i.e., lens 310 and lens 345. This new parameter is independent of the overall length of the optical path in the optical cloak 305 and the distance between optical relay groups (e.g., the distance between a group including lenses 310 and 320 and a group including lenses 335 and 345). For example, the spacing between the first and last lenses 310 and 345 can be set to twice the diameter of the lenses 310 and 345 which provides enough spacing to place the mirrors 315 and 340 in the optical path. The solution to the matrices for the optical elements (which consider the extra spacing between the first and last lenses) allows for the focal lengths of the all the lenses to be equal, which in this example, results in spacing between the two relay groups that is six times the focal length of each lens in the group (if all lenses have equal focal lengths). Like above, the matrices for the optical components are equated to the predefined matrix representing light passing through empty space between the input lens 310 and the output lens 345 in order to identify the focal lengths and spacing of the lenses. In this manner, the folded optical cloak 305 can reflect the optical path in different directions to generate folds and still maintain the user's perspective.

FIG. 3B is structurally equivalent to FIG. 3A but illustrates how the optical cloak 305 performs when receiving light from a distant point in the environment. Here, after the light passes through lens 310 and reflects off mirror 315, the light focuses at the screen 160 rather than at a point beyond the screen 160 as shown in FIG. 3A. Moreover, instead of collimating the light, lens 335 again inverts the image so that after passing through lens 345, the view 145 has the same orientation as view 105. While the actual paths 365 taken by the light in the optical cloak 305 differs greatly from the idealized paths 360 (i.e., the path the light would take if the light passed through empty space), at the output of the optical cloak 305, the idealized paths 360 and the actual paths 365 merge thereby maintaining the perspective of the user. Thus, FIGS. 3A and 3B illustrate the perspective of the user is maintained for light that is received within the field of view of the user as well as light received from a distant point in the background of the environment.

Figure 3C:
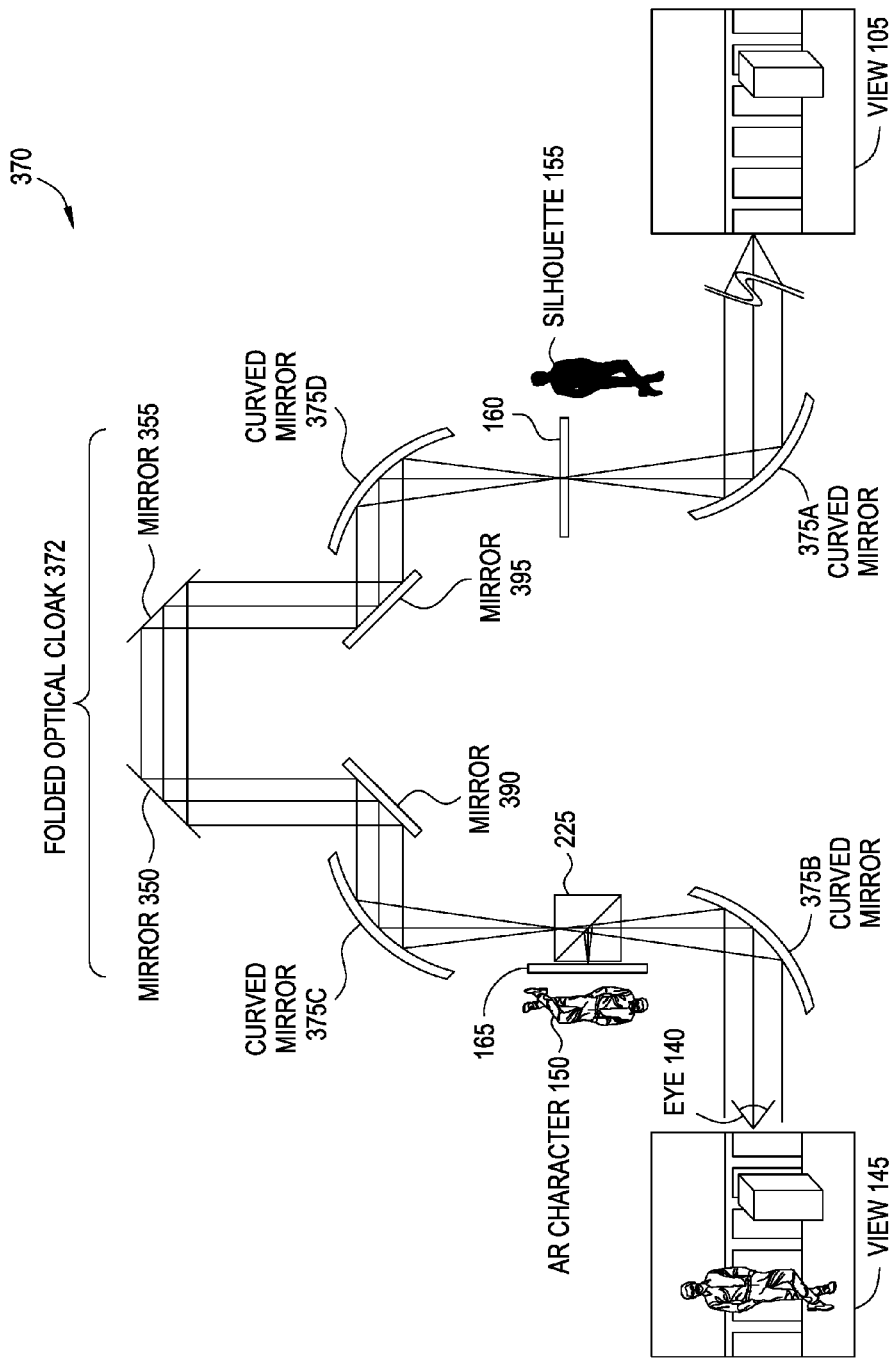

FIG. 3C illustrates an AR system 370 with a folded optical cloak 372, according to one embodiment described herein. In contrast to FIG. 3B, the mirror 315 and lens 310 are replaced by a single focusing element (i.e., curved mirror 375A) with a parabolic (or curved) reflective surface that both reflects and focuses the light. Moreover, mirror 340 and lens 345 is replaced by curved mirror 375B. In addition, instead of lens 335 and 320, the optical cloak 372 includes curved mirrors 375C and 375D along with mirrors 390 and 395 which focus the light onto mirrors 380 and 385.

As used herein, a focusing element can be a lens (which is transmissive) or a non-transmissive reflective surface (e.g., a curved mirror 375). Substituting lenses and/or mirrors with curved mirrors may reduce the overall weight and complexity of the optical cloak.

Figure 4:
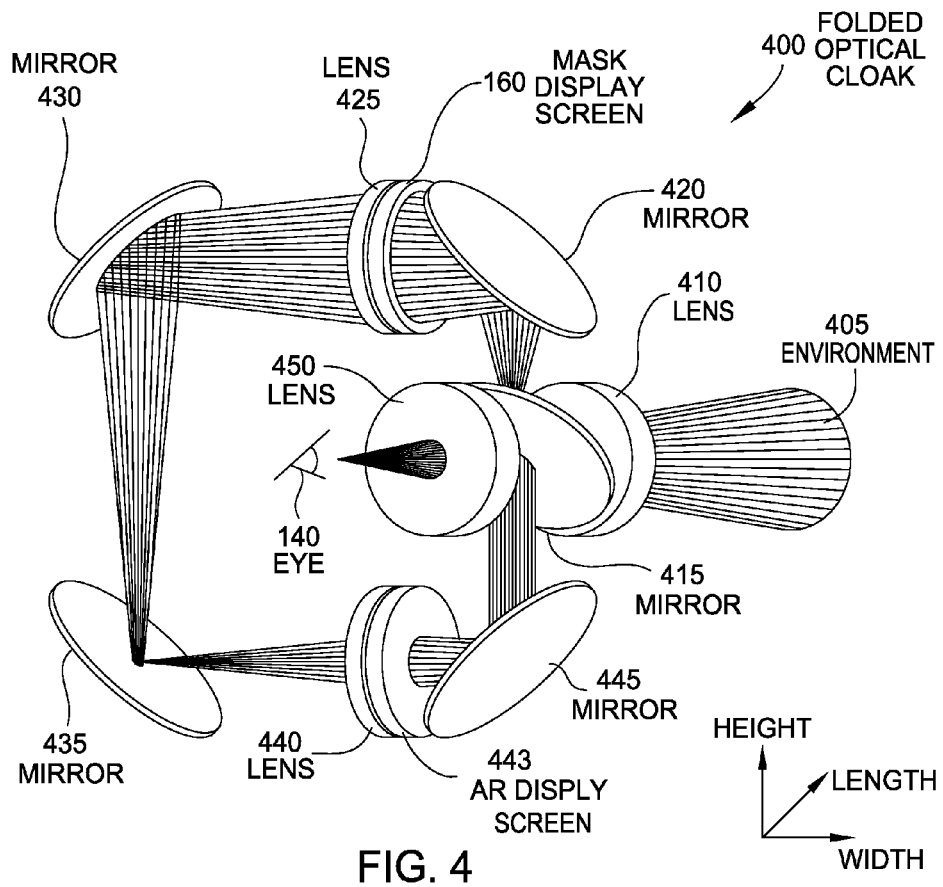
FIG. 4 illustrates a folded optical cloak, according to one embodiment described herein.

FIG. 4 illustrates a folded optical cloak 400, according to one embodiment described herein. As shown, light from the environment 405 enters the optical cloak 400 via lens 410.

A first surface of the mirror 415 reflects the light in a direction towards mirror 420. The mirror 420 again redirects the light so that the light passes through the mask display screen 160 and a lens 425. The screen 160 occludes a portion of the light to form a black silhouette (not shown) in the image. Mirrors 430 and 435 redirect the light until the light reaches lens 440 and the AR display screen 443. Unlike AR display screen 165 which emits light in a direction perpendicular to the direction the light is propagating, here, the AR display screen 443 emits light in the same direction as the direction of propagation. More specifically, like the mask display screen 160, the light received from the environment passes through the screen 443. In one embodiment, the screen 443 is an organic light emitting diode (OLED) display where the portion displaying the AR content (which corresponds to the blacked out silhouette introduced by screen 160) is illuminated while the remaining portion of the OLED display is not. Because the non-illuminated portion can be transparent, the light from the environment can pass through the non-illuminated portion of the screen 443 substantially unabated. In this manner, the light received from the environment can be combined with light illuminating AR content.

The optical cloak passes the real-world image with all of its 3D cues, including accommodation and stereopsis (if the optical cloak is large enough). With a single set of 2D image display and mask, the AR content will appear planar. To appear more integrated into the real-world scene, the AR content should mutual occlusion (provided by the display and mask), as well as other 3D cues such as stereopsis and accommodation. A set of two optical relays can also be used (one for each eye) to produce stereoscopic (left-right eye pairs) 3D views of AR content.

After passing through screen 443, a mirror 445 reflects the light towards a second surface of the mirror 415 when in turn reflects the light through lens 450 and in to the eye 140. Thus, the mirror 415 is a double-side mirror which may reduce the distance between the input lens 410 and the output lens 450 relative to the optical cloak 305 illustrated in FIGS. 3A and 3B which includes two separate mirrors between the lenses 310 and 345. Moreover, optical cloak 400 includes the extra mirrors 420 and 445 which reflect the light along a plane that is perpendicular to the view point of the user's eye 140. That is, the mirrors in optical cloak 400 reflect the light along a plane that is perpendicular to the direction the light enters through lens 410. In contrast, the optical cloak 305 in FIGS. 3A and 3B uses its mirrors to reflect the light along a plane that is parallel with the direction the light enters through lens 310.

The arrangement shown in FIG. 4 may move the center of mass of the optical components in the cloak 400 closer to the user relative to the center of mass of optical cloak 305 and still maintain the perspective of the user. That is, using the mathematical model and matrices described above, the spacing and characteristics of the optical elements in the optical cloak 400 can be set such that the light outputted by the lens 450 appears to the user to have passed through empty space rather than being reflected and altered by the various mirrors and lenses in the optical cloak 400.

Figure 5:
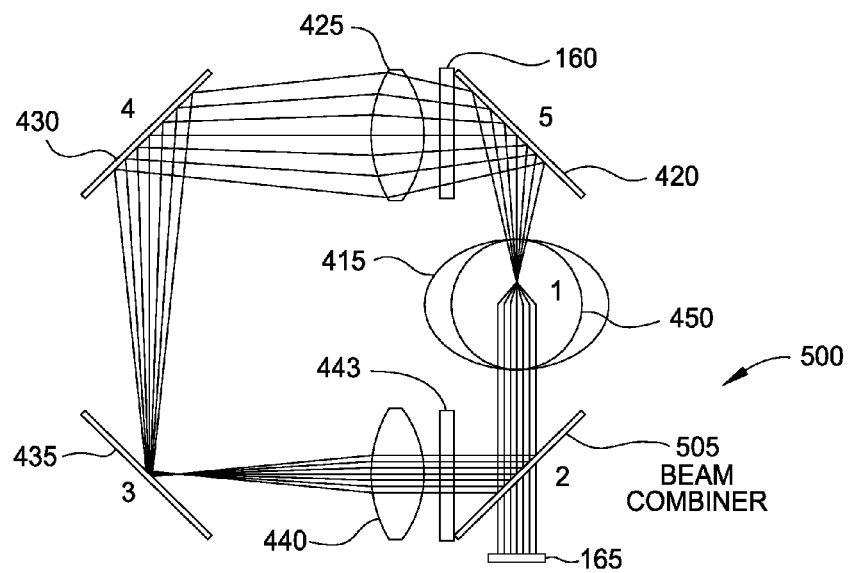
FIG. 5 illustrates a front view of the optical cloak in FIG. 4, according to one embodiment described herein.

FIG. 5 illustrates a front view of the optical cloak 400 in FIG. 4, according to one embodiment described herein. That is, FIG. 5 illustrates a view of the optical cloak from the perspective of the user. As such, FIG. 5 does not illustrate the input lens 410 (which is occluded by the double-sided mirror 415 and the output lens 450. Like above, the received light is reflected by the mirror 415 to the mirror 420 which directs the light through the mask display screen 160 and the lens 425. The mirrors 430 and 435 reflect the occluded image to the lens 440 and through the screen 443. The mirror 445 reflects the image (which now includes the AR content) towards the double-sided mirror 415 which in turn reflects the light to lens 450 and to the user.

The cutout 500 illustrates an alternative embodiment to the arrangement shown in FIG. 5. Instead of transmitting the received light through the screen 443 (e.g., an OLED display), the optical cloak 400 may use the AR display screen 165 (e.g., an LCD display) as shown in FIGS. 2-3. To do so, instead of mirror 445, the embodiment shown in cutout 500 includes a beam combiner 505. A first side of the combiner 505 facing the lens 440 is reflective which reflects the received light towards the double-sided mirror 415 (not shown in the cutout 500). However, a second side of the combiner 505 facing the AR display screen 165 permits the light emitted by the screen 165 (which includes the AR content) to pass through in a direction towards the double-sided mirror 415. In this manner, the AR content can be combined with the environment image like in optical cloaks 110 and 305.

Furthermore, the arrangement and order of the mirrors and the lenses in the optical cloak 400 may vary. In one embodiment, lens 410 is moved to a new position between the upper surface mirror 415 and mirror 420. Similarly, lens 450 can be moved between the bottom surface of mirror 415 and mirror 445. Thus, light received from the environment 405 first reflects of the upper surface of the mirror 415 before being focused by lens 410 and then reflected off mirror 420. After going around the loop, mirror 445 reflects the light through the lens 450. After passing through lens 450, the bottom surface of the mirror 415 reflects the light into the eye 140. This arrangement may further reduce the length dimension of the optical cloak 400 and move the center of mass of the cloak 400 closer to the user.

Figure 6:
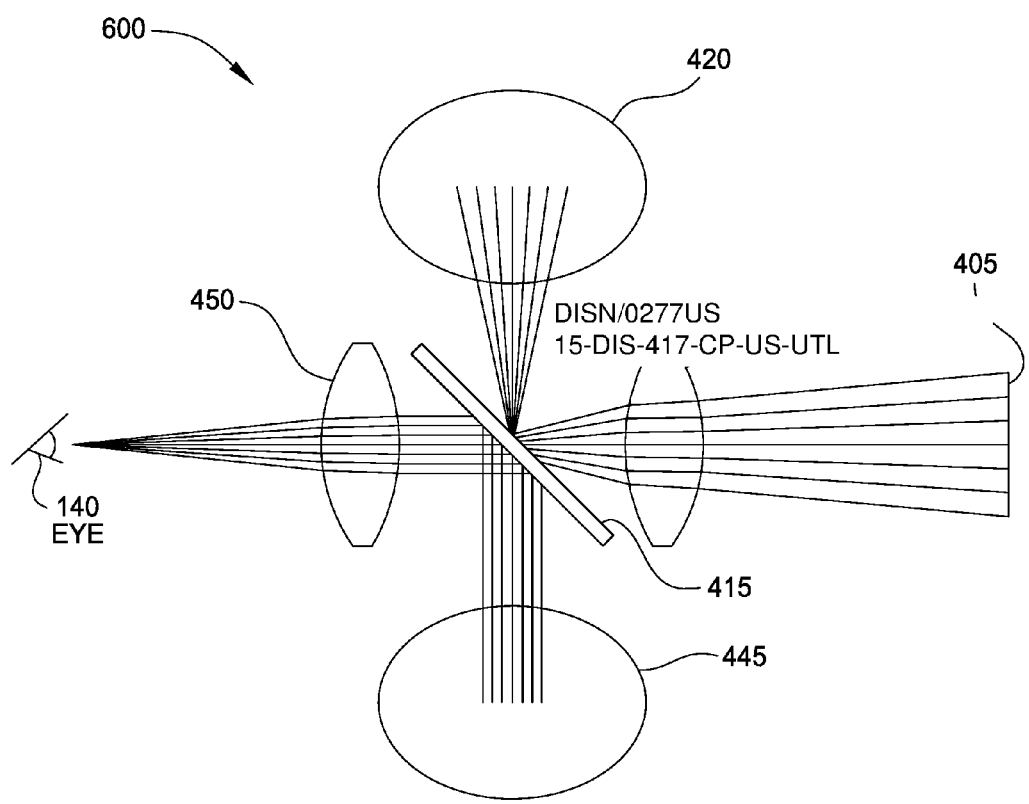
FIG. 6 illustrates a side view of the optical cloak in FIG. 4, according to one embodiment described herein.

FIG. 6 illustrates a side view of the optical cloak 400 in FIG. 4, according to one embodiment described herein. As shown, the light from the environment 405 enters from the right of the page and passes through the lens 410. The received light is then reflected by the top surface of the double-sided mirror 415 towards the mirror 420. After traversing the loop described above, the mirror 445 reflects the light to the bottom surface of the mirror 415 and through the lens 450 where the light is focused into the eye 140.

Figure 7:
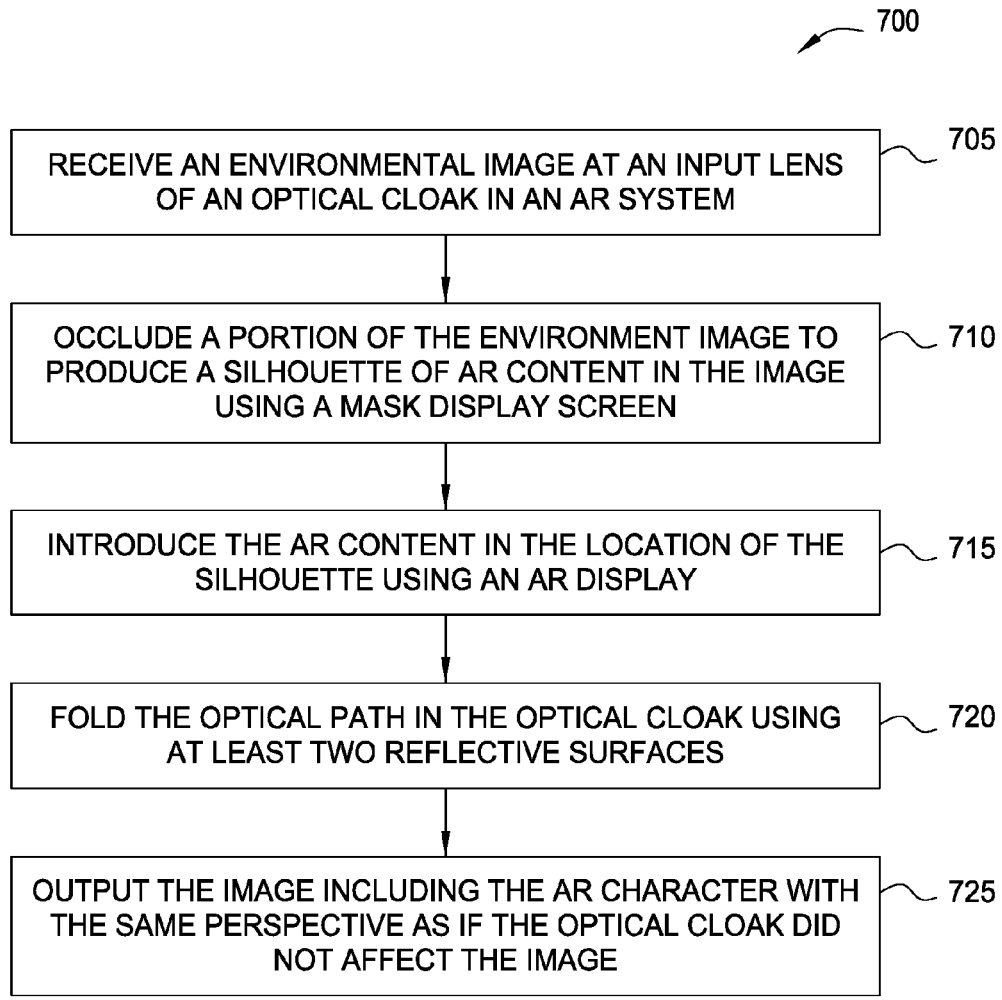
FIG. 7 is a flow chart for providing occluded AR content using a folded optical cloak, according to one embodiment described herein.

FIG. 7 is a flow chart of a method 700 for providing occluded AR content using a folded optical cloak, according to one embodiment described herein. Method 700 begins at block 705 where the optical cloak receives an environmental image at an input lens. In one embodiment, the optical cloak is integrated into a headset of an AR system (or two optical cloaks if stereoscopic views are desired). As the user moves her head, the input lens of the optical receives light corresponding to different environmental images. Furthermore, the AR system may include an object tracking system for identifying objects in the environment and determining the distance from these objects to the user.

At block 710, the optical cloak occludes a portion of the environmental image to produce a silhouette of AR content in the image using a mask display screen. In one embodiment, the mask display screen is a transparent LCD panel (without a backlight), electrowetting display, electrochromic display, and the like. While most of the light of the environmental image is permitted to pass through the mask display screen unabated, the optical cloak controls a portion of the screen to block or occlude some of the light thereby created a black silhouette in the environmental image. In one embodiment, the black silhouette matches an outline or boundary of the AR content that is introduced later into the image.

At block 715, the optical cloak introduces the AR content in the location of the silhouette using an AR display screen. In one embodiment, the optical cloak introduces the AR content using non-transparent display screen such as a backlit LCD screen. For example, using a beam combiner, the optical cloak merges the light emitted by the LCD screen with the received light. Alternatively, the AR display screen can be an OLED screen where only the portion of the screen corresponding to the AR content emits light while the remaining portion of the OLED screen is transparent. As the light passes through the OLED screen, the AR content is added to the environmental image in order to integrate the AR content into the environment. Moreover, the optical cloak can include logic that synchronizes the locations of the black silhouette and the AR content in the mask and AR display screens so that the AR content overlaps the black silhouette in the image provided to the user.

At block 720, the optical cloak folds the optical path in the optical cloak using at least two reflective surfaces. The optical cloak may include any number of mirrors that alter the propagation path of received light as it travels through the optical cloak. Although the user's perspective can be maintained even if the optical path is not folded, doing so may improve the physical dimensions of the optical cloak for integrated the cloak into a wearable device such as a headset. Moreover, folding the optical path may move the center of mass of the optical cloak closer to the user which may improve the ability of the user to move the optical cloak and the comfortability of a wearable device containing the optical cloak.

At block 725, the optical cloak outputs an image that includes the AR content with the same perspective as if the optical cloak did not affect the image. Put differently, the light rays forming the image exits the optical cloak along the same direction and location as if the light rays had passed through free space. As such, the user's perspective of the environment is the same as if the user was not viewing the environment through the optical cloak.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An augmented reality (AR) system, comprising:
a first focusing element configured to receive light defining a view of a user environment;
a mask display screen configured to occlude a selected portion of the view as the received light passes through the mask display screen;
an AR display screen configured to generate AR content that appears in the view at a location of the occluded selected portion; and
a second focusing element configured to emit the view containing the AR content to a user, wherein a spacing between the first and second focusing elements is set such that when the received light defining the view exits the second focusing element, the exiting light propagates in respective first directions that are the same as respective second directions of the received light entering the first focusing element,
wherein the spacing between the first and second focusing elements maintains, at least in part, a perspective of the user at a location of an eye of the user viewing the view provided by the second focusing element, wherein the spacing between the first and second focusing elements is set such that, to the perspective of the user, the first and second focusing elements do not redirect the received light from the first directions as the received light travels through the AR system.

2. The AR system of claim 1, further comprising:
an intermediate focusing element disposed in an optical path between the mask display screen and the second focusing element on which the received light defining the view travels, wherein a first spacing between the intermediate focusing element and the first focusing element and a second spacing between the intermediate focusing element and the second focusing element are such that the received light defining the view exits the second focusing element as if the received light passed through free space thereby maintaining a perspective of the user at a location of the user viewing the view.

3. The AR system of claim 2, wherein respective focal lengths of the first focusing element, the intermediate focusing element, and the second focusing element are set such that the received light defining the view exits the second focusing element as if the received light passed through free space.

4. The AR system of claim 1, further comprising:
logic configured to control the mask display screen and AR display screen such that the AR content in the view overlaps the selected portion occluded by the mask display screen, wherein the received light strikes a first side of the mask display screen and exits through a second side of the mask display screen when passing through the mask display screen, wherein the first side is opposite the second side.

5. The AR system of claim 1, further comprising:
a plurality of reflective surfaces configured to redirect an optical path of the received light as the received light travels between the first and second focusing elements, wherein the plurality of reflective surfaces fold the optical path.

6. The AR system of claim 5, wherein the mask display screen is disposed in the optical path after the optical path has been redirected by one of the plurality of reflective surfaces.

7. An AR system, comprising:
a first focusing element configured to receive light defining a view of a user environment;
a mask display screen configured to occlude a selected portion of the view as the received light passes through the mask display screen;
an AR display screen configured to generate AR content that appears in the view at a location of the occluded selected portion;
a second focusing element configured to emit the view containing the AR content to a user, wherein a spacing between the first and second focusing elements maintains, at least in part, a perspective of the user at a location of an eye of the user viewing the view provided by the second focusing element, wherein the spacing between the first and second focusing elements is set such that, to the perspective of the user, the first and second focusing elements do not redirect light received at the first focusing element as the received light travels through the AR system; and a plurality of reflective surfaces configured to redirect an optical path of the received light as the received light travels between the first and second focusing elements, wherein the plurality of reflective surfaces fold the optical path.

8. The AR system of claim 7, an intermediate focusing element disposed in the optical path between the mask display screen and the second focusing element, wherein a first spacing between the intermediate focusing element and the first focusing element and a second spacing between the intermediate focusing element and the second focusing element are such that the received light defining the view exits the second focusing element as if the received light passed through free space thereby maintaining a perspective of the user at a location of the user viewing the view.

9. The AR system of claim 8, wherein respective focal lengths of the first focusing element, the intermediate focusing element, and the second focusing element are set such that the received light defining the view exits the second focusing element as if the received light passed through free space.

10. The AR system of claim 7, further comprising:
a different mask display screen spaced apart from the mask display screen;
a different AR display screen spaced apart from the AR display screen, wherein the AR system is configured to perform depth blending using the mask display screen, the different mask display screen, the AR display screen, and the different AR display screen to achieve accommodation cues.

11. The AR system of claim 7, wherein the fold of the optical path formed by the plurality of reflective surfaces includes a first portion of the optical path where the received light propagates in a first direction and a second portion of the optical where the received light propagates in a second direction opposite the first direction.

12. A method, comprising:
receiving light defining a view of a user environment at a first focusing element;
occluding a selected portion of the view to produce a silhouette of AR content in the view;
introducing the AR content into the view at the location of the silhouette;
outputting the view containing the AR content at a second focusing element, wherein a spacing between the first and second focusing elements maintains, at least in part, a perspective of a user at a location of an eye of the user viewing the view provided by the second focusing element, wherein the spacing between the first and second focusing elements is set such that, to the perspective of the user, the first and second focusing elements do not redirect light received at the first focusing element as the received light travels between the first and second focusing elements.

13. The method of claim 12, further comprising:
focusing the received light using an intermediate focusing element disposed in an optical path between a screen occluding the selected portion of the view and the second focusing element, wherein a first spacing between the intermediate focusing element and the first focusing element and a second spacing between the intermediate focusing element and the second focusing element are such that the received light defining the view exits the second focusing element as if the received light passed through free space thereby maintaining a perspective of the user at a location of the user viewing the view.

14. The method of claim 12, further comprising:
controlling a mask display screen occluding the selection portion and an AR display screen displaying the AR content such that the AR content added to the view overlaps the selected portion occluded by the mask display screen.

15. The method of claim 12, further comprising:
reflecting the received light in a plurality of directions to fold an optical path the received light travels between the first and second focusing elements.

16. The method of claim 15, wherein the selected portion is occluded after the received light is reflected in at least one of the plurality of directions.

* * * * *